United States Patent [19]

Shiotani et al.

[11] Patent Number: 4,796,440
[45] Date of Patent: Jan. 10, 1989

[54] ICE CREAM MAKER

[75] Inventors: Tadahiko Shiotani; Hideo Matsuura, both of Aichi, Japan

[73] Assignee: Sanyei Corp., Japan

[21] Appl. No.: 110,209

[22] Filed: Oct. 19, 1987

[30] Foreign Application Priority Data

| Jan. 28, 1987 | [JP] | Japan | 62-10836[U] |
| Jun. 19, 1987 | [JP] | Japan | 62-95206[U] |
| Jun. 19, 1987 | [JP] | Japan | 62-95207[U] |
| Jun. 19, 1987 | [JP] | Japan | 62-95208[U] |
| Jun. 19, 1987 | [JP] | Japan | 62-95209[U] |

[51] Int. Cl.⁴ .............................................. A23G 9/12
[52] U.S. Cl. .................................... 62/343; 222/227; 222/242; 366/186; 366/196; 366/309
[58] Field of Search ............... 62/342, 343; 222/146.6, 222/240–242, 226, 227, 236; 366/144, 186, 196, 309, 310, 312

[56] References Cited

U.S. PATENT DOCUMENTS

| 1,477,434 | 12/1923 | Enright | 222/240 |
| 1,486,328 | 3/1924 | Fraser | 366/186 X |
| 1,915,634 | 6/1933 | Vogt | 62/342 X |
| 2,773,629 | 12/1956 | Miller | 222/226 |
| 3,064,831 | 11/1962 | Cook | 222/236 X |
| 3,818,716 | 6/1974 | Carpigiani | 62/343 X |
| 4,391,575 | 7/1983 | Osrow | 366/196 X |
| 4,509,862 | 4/1985 | High et al. | 366/186 X |
| 4,669,275 | 6/1987 | Ohgushi et al. | 62/342 |

FOREIGN PATENT DOCUMENTS

| 48-21511 | 6/1973 | Japan . |
| 49-23664 | 5/1974 | Japan . |
| 49-22069 | 7/1974 | Japan . |
| 49-35192 | 10/1974 | Japan . |
| 52-22499 | 2/1977 | Japan . |
| 53-121199 | 9/1978 | Japan . |
| 54-46349 | 11/1979 | Japan . |
| 55-41023 | 9/1980 | Japan . |
| 59-21672 | 6/1984 | Japan . |
| 59-25193 | 7/1984 | Japan . |
| 59-30699 | 9/1984 | Japan . |
| 60-11811 | 4/1985 | Japan . |
| 61-170290 | of 1986 | Japan . |
| 61-9582 | 3/1986 | Japan . |
| 61-9583 | 3/1986 | Japan . |
| 61-9584 | 3/1986 | Japan . |
| 61-66496 | 5/1986 | Japan . |
| 61-173288 | 10/1986 | Japan . |

*Primary Examiner*—William E. Tapolcai
*Attorney, Agent, or Firm*—Ostrolenk, Faber, Gerb & Soffen

[57] ABSTRACT

An ice cream preparation apparatus having a cold storage container with a hole through its bottom in which a supporting member is disposed. A rotating screw in the hole through the supporting member moves material through that hole and out the bottom of the container. A covering plate is selectively openable and closable over the hole. A first rotatable blade is inclined downwardly along the inner surface of the cold storage container moves material off the wall. A second blade rotates around the bottom of the container. A second screw type rotary member extends along the radial direction parallel to the second blade and is rotated for moving material toward the supporting member. A third blade is upstanding in the container.

15 Claims, 7 Drawing Sheets

ICE CREAM MAKER

BACKGROUND OF THE INVENTION

This invention relates to an ice cream making apparatus for making ice cream, sherbet, etc. and it particularly relates to a stirring mechanism that mixes a cooled ice cream material approximately uniformly.

In Japanese Utility Model Application No. Sho 62-10836, ice cream is prepared by a rotary member which is supported in a cold storage container to rotate a blade that is inclined downwardly in the counter-rotation direction along the inner surface of the cold storage container. A screw driven by the rotary member is rotatably supported inside a supporting member. That supporting member has been inserted into a through hole that is formed on the bottom of the cold storage container. The ice cream material that has adhered to the inner surface of the container is scraped down by the blade. This scraping occurs along with the cooling of the cold storage container. At the same time, the cooled ice cream material is mixed by the screw that rotates inside the supporting member, thereby preparing ice cream. The prepared ice cream is discharged outside through an opening at the lower end of the supporting member, along with rotation of the screw.

In this conventional ice cream making apparatus, however, it is difficult to introduce the ice cream that has been scraped down from the inner surface of the cold storage container and the ice cream material into the supporting member in the bottom of the container. As a result, it has not been possible to prepare high-grade ice creams with fine texture, with the ice cream material being mixed approximately evenly. In addition, it has not been possible to accurately discharge the ice cream from inside the cold storage container.

SUMMARY OF THE INVENTION

It is an object of this invention to provide an ice cream preparation apparatus which smoothly introduces the ice cream inside the cold storage container and moves the ice cream material to the outlet screw, thereby mixing the materials approximately evenly, and which can discharge them outside and which is capable of preparing high-grade ice cream, to improve upon the prior art.

For accomplishing this purpose, the invention comprises a cold storage container and mixer and conveying means for ice cream. The container has a through hole in its bottom. A cold storage agent is sealed around the container. A supporting member is inserted into the through hole of the container. The supporting member has a support hole that is connected with the central part in the up-and-down direction. A switching member opens and closes the lower-end opening of the supporting member. There is a rotary member, and driving means rotate the rotary member in a required direction. A screw is supported rotatably inside the support hole of the supporting member and is rotated by the rotary member. The rotary member supports a first blade that inclines downwardly in the counter-rotation direction along the inner surface of the cold storage container.

Moving means extend in the radial direction of the rotary member and are operated so as to move material radially inwardly along the bottom surface of the cold storage container. The moving means are connected with the rotary member to sweep around the supporting member as the rotary member rotates The moving means also is an externally threaded or fluted shaft that is rotated around an axis along a radius of the container to move material inwardly. That shaft is rotated through engagement with the stationary supporting member as the shaft sweeps around the container.

Other blades in the container are driven by the rotary member to also move the material down to the moving means.

Ice cream is prepared by stirring and mixing due to a convection generated by the moving means, while the ice cream material that has adhered to the inner surface of the container is being scraped off by the blade. Preparation also requires cooling by the cold storage agent that has been sealed around the cold storage container.

The ice cream that has been prepared in the manner described above is introduced into the support hole of the supporting member by the moving means after it is scraped off the inner surface of the cold storage container, and the ice cream is discharged from an open support hole because of the movement of the switching member from the screw that rotates.

BRIEF DESCRIPTION OF THE DRAWINGS

Other objects and features of this invention are explained below with reference to the drawings.

DESCRIPTION OF THE PREFERRED EMBODIMENT

Figure 1:
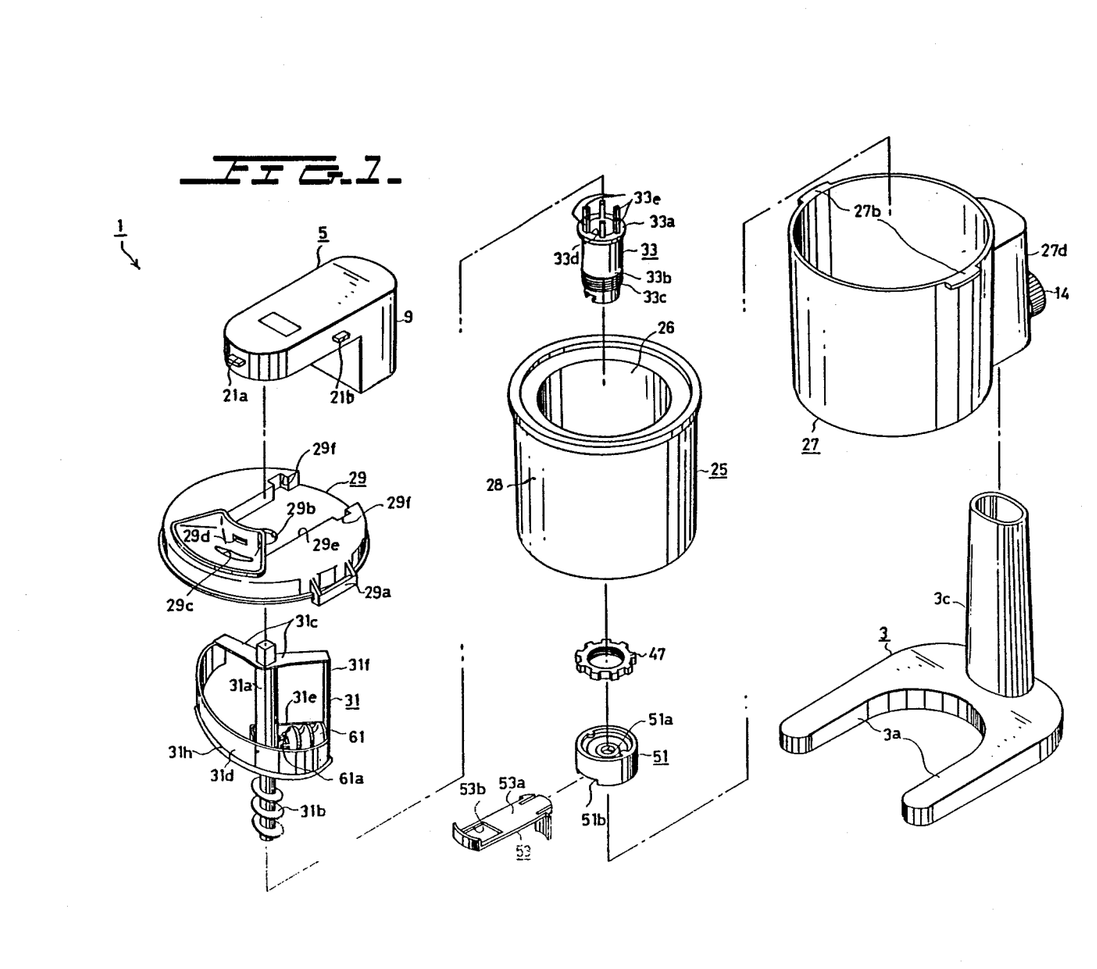
FIG. 1 is an exploded perspective view of an ice cream manufacturing apparatus according to this invention.

The ice cream manufacturing apparatus 1 comprises a support stand 3, a driving part 5 and a main manufacturing unit 7.

The support stand 3 includes an integral bifurcated support base whose legs 3a extend out in the horizontal direction and may be placed on a desk or any surface. It includes a support part 3c which stands upwardly from the base end of the base 3a. The cross-section of the part 3c is generally oval. The outer periphery at the top of part 3c has an engaging depression 3b. Stand part 3c is comprised of synthetic resin.

A casing 9 for the driving part 5 accommodates an electric motor 17 that is a driving means for driving a driving gear 15. On the gear 15, there is integrally formed a connective shaft 15a having a hollow part of odd-shaped cross-section. Shaft 15a is connected with the electric motor 17 through a train of gears 19. This assures that driving by the electric motor 17 rotates the driving gear 15 at a required reduction ratio.

Engaging parts 21a and 21b are integrally formed at the outward tip and on the right and left sides, respectively, of the case 9, as is shown in FIG. 1. The engaging part 21a engages with the engaging hole 29d in a cover 29, described below, and the engaging part 21b is received in the engaging groove 29f in cover 29.

Figure 4:
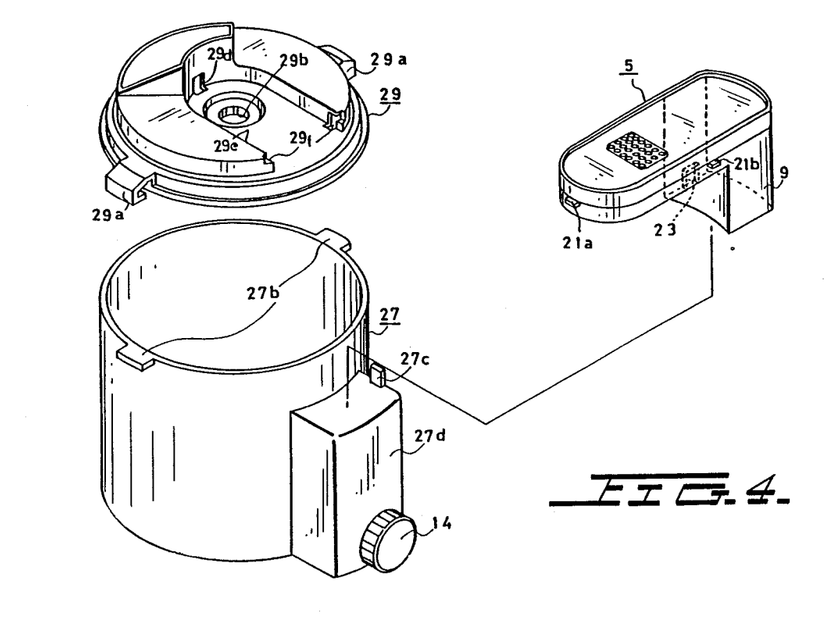
FIG. 4 is a perspective view showing the installation structure of the cover and the main manufacturing body against the driving part.

An engageable concave depression 23, which is shown in FIG. 4, is formed on the left-hand side of the base end of the case 9 which hangs down at the right in FIG. 1. An engaging protrusion 27c of the main container 27 is received in the engaging concave depression 23.

Figure 2:
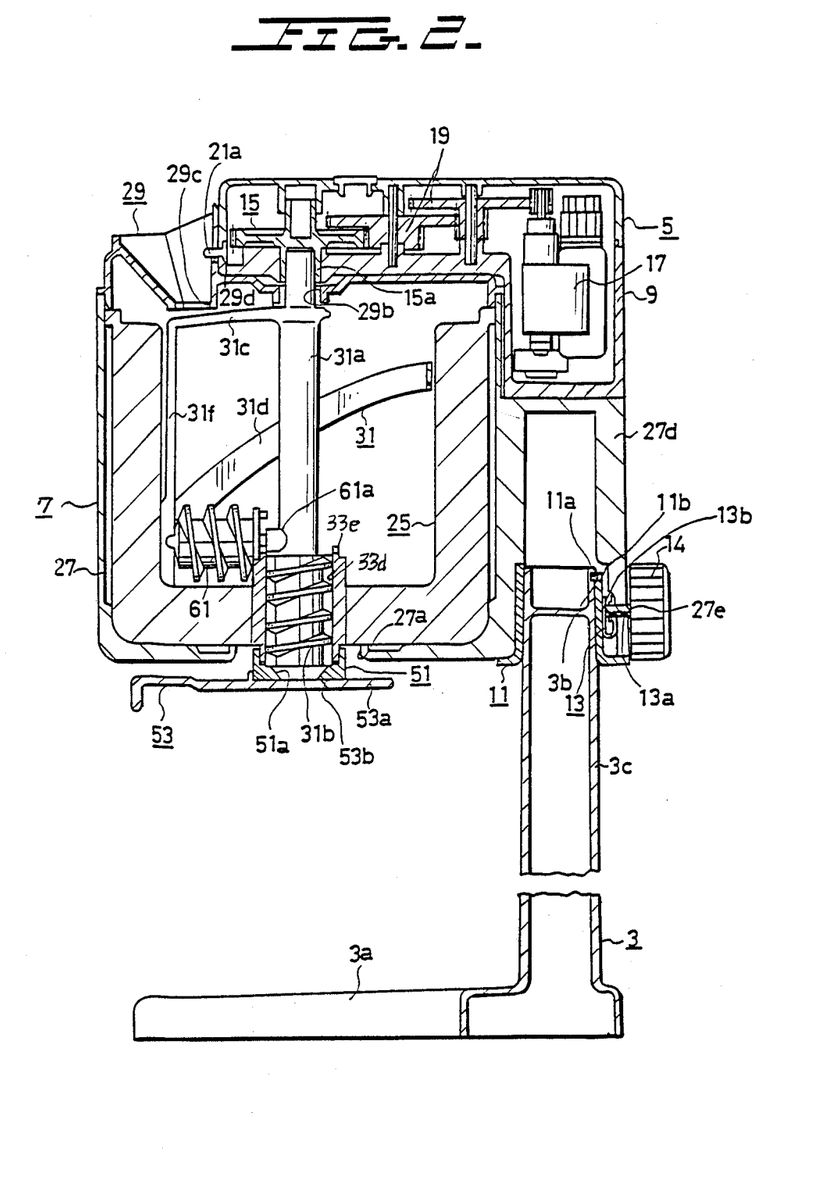
FIG. 2 is a vertical section cut along the center of the assembled ice cream preparation apparatus.
Figure 3:
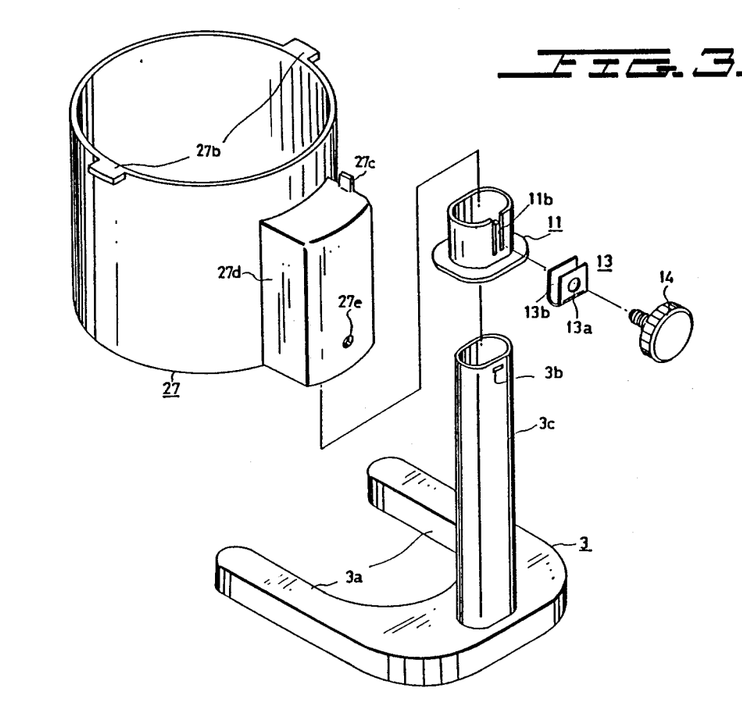
FIG. 3 is a perspective view showing the supporting structure of the main container for the support stand.

As shown in FIG. 2, the main manufacturing body 7 is comprised of a cold storage container 25, a main container 27 in which the cold storage container 25 is accommodated, a covering body 29 which closes the opening at the top of the container 25 and the main container body 27, and a rotary member 31 which is rotatably supported inside the cold storage container 25.

Figure 5:
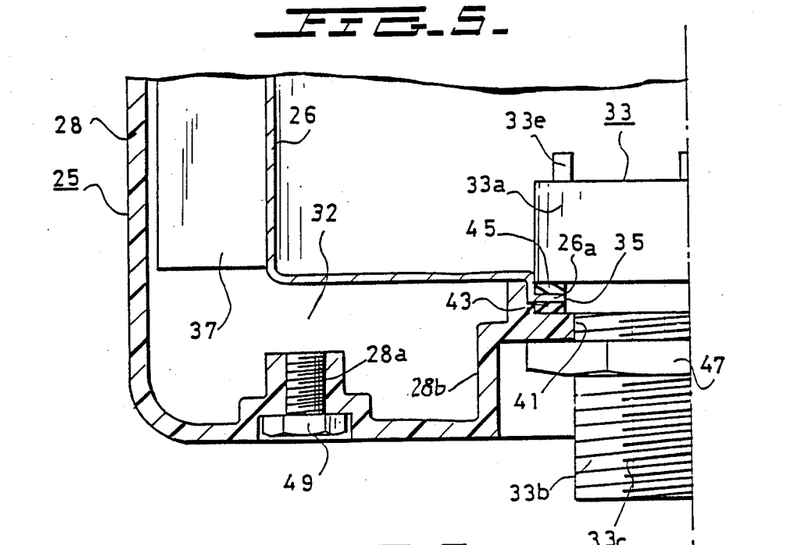
FIG. 5 is a partial vertical view showing the installation of the supporting member.

As shown in FIG. 5, cold storage container 25 is comprised of an inner container 26 made of a metal, such as stainless steel or aluminum, etc. whose heat conductivity is high, an outer container 28 disposed around and radially spaced a required distance from the outside surface of the inner container 26 and made of a synthetic resin whose heat conductivity is low, a cold storage agent 32 which is sealed in the gap between the inner container 26 and the outer container 28, and a cylinder 3.

Figure 6:
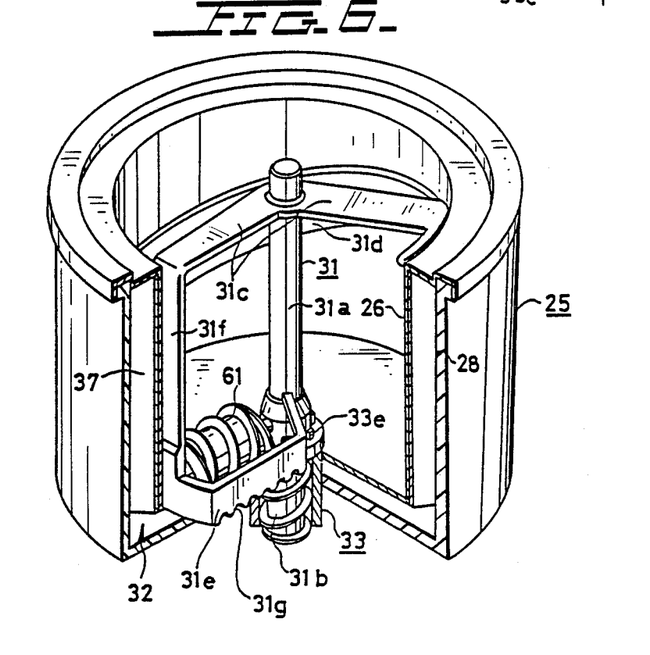
FIG. 6 is a perspective, partially cut away view of the rotary member.

The inside container 26 has an approximately cylindrical shape closed at the bottom. As shown in FIG. 6, the top of the container 26 is bent outwardly to the outer peripheral side. It is then bent back inwardly to hang down and engage the top of the outside container 28. The bottom of container 26 includes a downwardly depressed annular engagement piece 26a which conforms to the inner peripheral edge of the opening 35 at the center of the container bottom and this may extend to a required width in the radially inward direction.

Around the outer peripheral surface of the inside container 26 is installed a bellows-shaped fin 37, which extends vertically through the space between containers 26 and 28.

The outside container 28 has the approximate shape of a cylinder with a bottom spaced a required distance from the outer peripheral surface of the inside container 26. Container 28 has a top part which is fixed by a packing (not shown) to the outwardly bent top of the inside container 26. A boss 28b is formed on the peripheral edge of the opening 41 which is formed at the center of the bottom of the outside container 28. On the upper surface of the boss 28b, the annular engagement piece 26a of the inside container 26 is overlapped via a ring-shaped packing 43.

In addition, the engaging piece 26a of the inside container 26 and the boss 28b of the outside container 28 are held together by the head part 33a of a cylinder 33, and the lower part of that cylinder is inserted into the openings 35 and 41.

The cylinder 33 is comprised of a synthetic resin with low heat conductivity The cylinder 33 includes a large diameter head part 33a which engages the upper surface of the engaging piece 26a of the inside container 26 and includes a small diameter shank part 33b which is inserted into the opening 35 in the container 26 and the opening 41 in the boss 28b. A screw thread 33c is provided on the outer periphery of the small diameter part 33b.

The large diameter part 33a engages the upper surface of the engaging piece 26a of the inside container 26 through a packing 45. The small diameter part 33b inserted into the openings 35 and 41 sandwiches the engaging piece 26a of the inside container 26 and the boss 28b of the outside container 28 through a nut 47 that has been screwed onto thread 33c from below the outside container 28. This integrates the inside container 26 and the outside container 28. The nut 47 is held against and fixed to the lower surface of the outside container 28 and is held to the cylinder 33.

The cylinder 33 is hollow, formed with a through hole 33d whose inner bore wall engages and supports the periphery of the flute of a screw 31b in a rotatable manner. At the upper part of the large-diameter part 33a are integrally formed cog teeth 33e, which are erect at a required distance around the axial line. Those teeth cooperate with the below described rotary member 61.

On the lower end of the cylinder 33 is installed a holder 51. It has a hole 51a through its base that is connected with the through hole 33d in cylinder 33. An engaging concave groove 51b is formed on the lower surface of the holder 51 (FIG. 1).

There is received in the engaging concave 51b a slide plate 53 which has a plane part 53a that blocks the concave groove 51b and is received in the hole 51a to be supported movably along directions that are at a right angle with the axial line.

At the bottom of the outside container 28, there is a screw hole 28a. A cold storage agent 32 can be poured into the gap between the inside container 26 and the outside container 28 through the screw hole 28a. The screw hole 28a is closed by a screw 49 that is screwed into the hole subsequent to the pouring of the cold storage agent 32.

The cold storage container 25 is formed approximately in the shape of a cylinder having a bottom comprised of a synthetic resin having a low heat conductivity. At the bottom of the container 27, there is a through hole 27a into which the cylinder 33 is inserted. On the upper edge of the main container 27 are formed tabs 27b which are to be engaged.

On the outer periphery at one side of the main container 27, there is integrally formed an installation part 27d. It has an oval-shaped vertical hollow that corresponds in shape to and receives the stand support part 3c. On the lower end of the installation part 27d, there is a fixing ring 11 with an elastic piece 11b having an integral claw part 11a which is capable of engagement with the engagement concave depression 3b in the stand. The claw part is installed at a required distance between the elastic piece 11b and the inner surface of the installation part 27d.

A U-shaped compressive member 13 made of a spring metal is provided between the elastic piece 11b and the inner surface of the installation part 27d. On one leg of the compressive member 13, there is a nut 13a which is connected with the hole 27e that is provided on the lower end of the installation part 27d. On the other leg of the member 13, there is a compressive piece 13b which presses against the elastic piece 11b. The compressive piece 13b is inserted into the hole 27e and touches the axial end of the installation screw 14 that is engaged with the nut part 13a, thereby elastically deforming the elastic piece 11b.

The upper surface of the installation part 27d has integrally formed on it an engaging protrusion 27c that engages in the engaging concave depression 23 which prevents rotation of the driving part 5 that is placed on the main container body 27.

A cover 29 is installed on the top of the container body 27, so as to be freely detachable. On the outer periphery of the cover 29 is an integrally formed engaging part 29a which engages each tab 27b on the container body. This installs the cover 29 freely detachably on the main container body 27 that accommodates the cold storage container 25.

A hole 29b is formed at the center of the cover 29 to enable the axial part 31a of the rotary member 31, described below, to be inserted. On the periphery of the upper surface, opening 29c is formed for the feeding of the ice cream material. On the inner side wall of the feed-opening 29c, an engaging hole 29d is formed for receiving the engaging protrusion 21. There is an upper concave depression 29e across the cover 29. At the sides of depression 29e, away from opening 29c, there are engagement grooves 29f that receive the engaging protrusion 21b of the driving part.

Inside the cold storage container 25, a rotary member 31 is supported freely rotatably. The rotary member 31 is an integral assembly including an axial part 31a having an upper part which is attached to rotate around connective axis 15a. The part 31a has an odd-shaped cross-section. The rotary member also includes a screw 31b which is supported inside the through hole 33d of the cylinder 33 and is freely rotatable in that hole.

On the upper part of the axial part 31a, there are integrally formed a pair of arms 31c that extend toward the inner peripheral surface of the cold storage container 25. On the outer end of one of the arms 31c, a first blade 31d inclines downwardly toward the counter-rotational direction of the rotary member 31 along the inner peripheral surface of the inside container 26. A second blade 31e extends toward the axial location along axial part 31a that corresponds to the upper part of the screw 31b along the bottom from the lower end of the first blade 31d. A third blade 31f stands up along the inner periphery of the inside container 26 between the other arm 31c and the outer end of the second blade 31e. All of these elements are integrally formed and all elements 31 rotate together.

Figure 7:
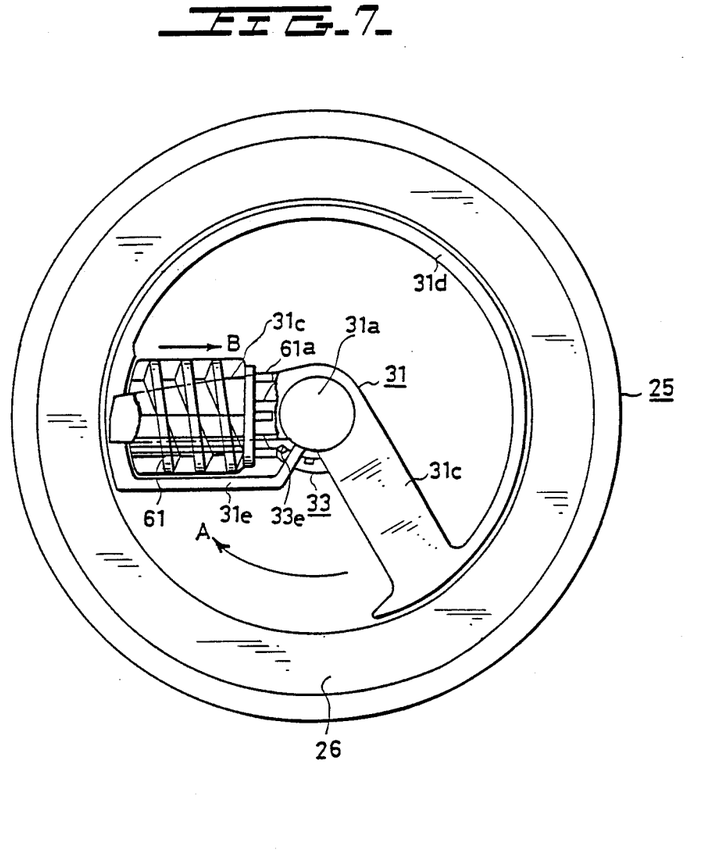
FIGS. 7 and 8 explain the function.

On the outside surface of the first blade 31d, there is an integral protrusion 31h which comes close to the inner peripheral surface of the inside container 26. On the lower side of the second blade 31e, a large number of convex ridges and concave depressions 31g are formed alternately in the radial direction. One axial end of the second blade 31e is supported rotatably on the first blade 31d and on the axial part 31a lower end. There is also supported by and freely rotatable on the blade 31e a moving means, i.e. a forwarding auger or screw 61 that serves as moving means for material and is arranged in such a manner as to provide some gap above the bottom surface of the inside container 26. The second blade 31e is disposed behind the screw 61 with which it rotates, as seen in FIG. 7.

On the inner terminal face of the screw 61, spaced radially out from the center of the screw 61, there are a plurality, e.g. four, integral protrusions 61a, which are circumferentially spaced apart and located to engage the cog teeth 33e, one protrusion projecting between two teeth 33e. The protrusions 61a are formed around the axial line at a prescribed radial distance. As the rotary member 31 rotates inside stationary support cylinder 33, the screw 61 is swept around the container 28, and the protrusions 61a engage the teeth 33e, which rotates the screw 61. The flutes on the screw are helical and oriented to move material in toward the rotary member 31 as the rotary member turns. The screw 61 rotates to forward material toward the axial part 31a along with the rotation of the rotary member 31.

Next, the function of the ice cream preparation apparatus which has been constructed in the manner described above is explained with reference to FIGS. 7 and 8.

The assembly of the ice cream preparation apparatus 1 is first described. With the installation screw 14 loosened, the main container body 27 is moved upward while the support part 3c of the supporting stand 3 is inserted into the hollow part of the installation part 27d. The claw part 11a of the fixed ring 11 engages in the engaging concave depression 3b of the support 3c. The installation screw 14 is tightened in this state. The elastic piece 11b is compressed by the contact between the axial end of the installation screw 14 and the compressive piece 13b of the compressive member 13, and this causes the claw part 11a to engage the concave depression 3b. An empty space for the insertion of a dish, cone, cup, etc. for the receipt of the manufactured ice cream is defined at the space being between the surface on which the apparatus sits and the lower surface of the main manufacturing body 7.

The engagement protrusion 21a on the driving part 5 is moved up to engage the engagement hole 29d and the protrusion 21b engages with the engagement groove 29f, which installs the cover 29 on the driving part 5.

In addition, as the engagement part 29a of the cover 29 engages the projecting tabs 27b of the body 27, while the upper part of the axial part 31a of the rotary member 31 is inserted into the connective axis 15a, the screw 31b is supported freely rotatably inside the through hole 33d of the cylinder 33 in the cold storage container 25 accommodated on the main container body 27. The main manufacturing body 7 is installed beneath the cover 29.

After the main manufacturing body 7 and the cover 29 have been installed, the driving part 5 is placed on the upper surface of the installation part 27d. Then there is engagement between the engaging protrusion 27c and the engaging concave depression 23 in the driving part 5 by rotation in the appropriate direction. This stops the driving part 5 from rotating with respect to the installation part 27d.

When the rotary member 31 is supported freely rotatably inside the cold storage container 25, the protrusions 61a at the end of the forwarding screw 61 are engaged with the cog teeth 33e of the cylinder 33. At that time, the hole 53b of the holder 51 is blocked by the slide plate 53.

The cold storage container 25 is cooled in a freezer compartment so that the sealed cold storage agent 32 is frozen to a required temperature.

FIG. 7 shows the rotary state of the rotary member 31. The electric motor 17 rotates the rotary member 31 in the direction of the arrow A. At the same time, the forwarding screw 61 is rotated to move material in the direction indicated by arrow B along with the rotation of the rotary member 31.

The prepared ice cream material is introduced into the cold storage container 25 through the feeding opening 29c in the cover 29. The ice cream material is cooled and adheres to both the inner peripheral surface and the bottom of the inside container 26. The freezing of the ice cream material is promoted by its adhesion to a prescribed thickness on the inner peripheral surface of the inside container 26 spaced from the third blade 31f. At the same time, the ice cream material that has adhered is scraped off by the first blade 31d. Moreover, ice cream material that has adhered to the bottom of the inside container 26 is scraped off by the second blade 31e.

The alternate concave and convex part 31g formed on the lower surface of the second blade 31e helps reduce the resistance to the rotation and scraping action of the second blade 31e and the rotary member 31. This avoids the concentrated action of the ice cream material against the second blade 31e. The ice cream material that has been collected to one side of the second blade 31e during its rotation is moved to the center of the container by means of the forwarding screw 61 that moves material to the axial part 31a side. This creates a convection current inside the cold storage container 25. Because of this, the ice cream material is stirred and mixed almost evenly while it is being cooled.

After the ice cream material has been mixed while it is being cooled to a required hardness, the hole 53b and the hole 51a of the holder 51 are brought into communication by the movement of the slide plate 53. The ice cream that has been prepared by this action is segregated to the side of the second blade 31e by the scraping action of the first and second blades 31d and 31e. It is discharged outside after being introduced into the cylinder 33 along with the rotation of the screw 31b.

Figure 8:
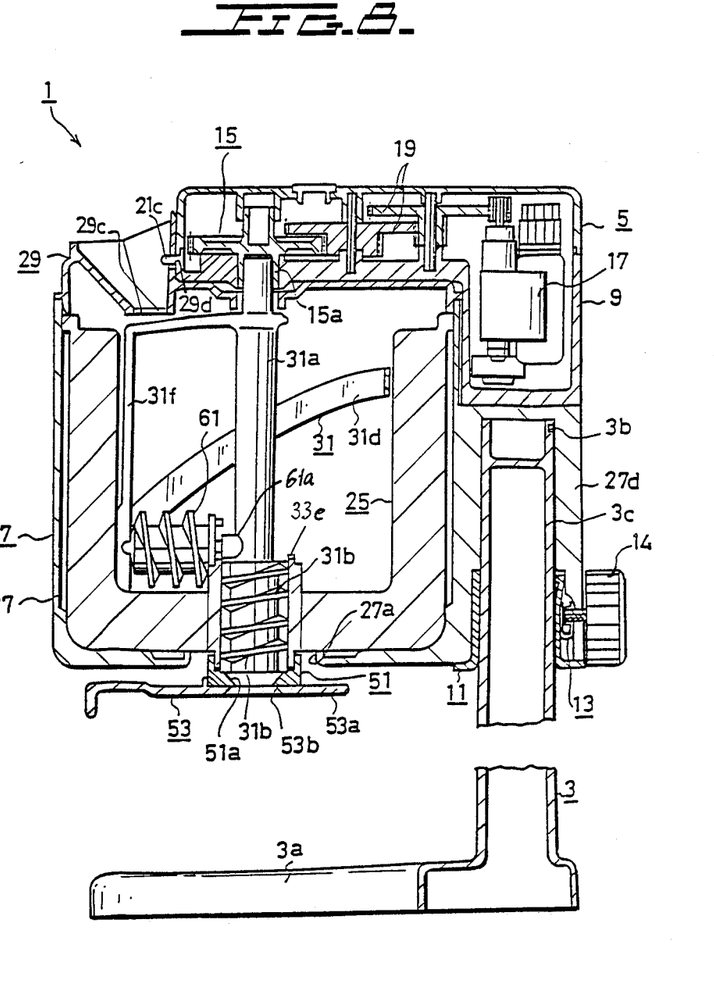

Referring to FIG. 8, upon completion of preparation of ice cream, the main container body 27 is moved down with respect to the support stand 3, by releasing the engagement between the part 27b to be engaged and the engaging part 29a by rotating the main manufacturing body 7. Then the main manufacturing body 7 can be taken out of the cover 29. When the engagement between the engaging protrusion 27c and the engaging concave depression 23 is released, the driving part 5 can be taken off the installation part 27d. When the engagement between the engaging protrusion 21a and engaging hole 29d and between the engaging protrusion 21b and engaging groove 29f are released, the cover 29 can be taken off the driving part 5.

After loosening of the installation screw 14, the main container body 27 is pushed downwardly and the engagement of the claw part 11a with the engaging concave recess 3b is released due to the elastic deformation of the elastic piece 11b. This is followed by the insertion of the support part 3c inside the hollow part of the installation part 27d. Because of this, the installation position of the main container body 27 can be lowered with respect to the support stand 3.

With this invention, it becomes possible to effect cooling, while carrying out stirring and mixing in the preparation of ice creams, by scraping the ice cream material that has adhered to the inner surface of the inside container 26 to a required thickness set by the third blade 31f, wherein the ice cream material is scraped off by the first and second blades 31d and 31e, and the scraped off material is moved to the center by the rotating forwarding screw 61, thereby effecting a convection.

For extracting prepared ice cream, ice cream that has adhered to the inner surface of the inside container 26 is scraped off by the first and second blades 31d and 31e. This is then introduced into the cylinder 33 by means of a rotary screw 61, for the purpose of subsequent discharge.

The invention introduces the ice cream and ice cream materials inside the cold storage container smoothly to a screw, thereby evenly mixing it and discharging it outside, and the ice cream preparation apparatus produces high-quality ice creams.

Although the present invention has been described in connection with a preferred embodiment thereof, many other variations and modifications will now become apparent to those skilled in the art. It is preferred, therefore, that the present invention be limited not by the specific disclosure herein, but only by the appended claims.

What is claimed is:

1. Apparatus for preparing ice cream, and the like, comprising:
   a cold storage container having a bottom; a hole through the bottom; means for selectively opening and closing the hole through the bottom of the cold storage container; a rotary member including a screw which is in the hole through the bottom of the container and the screw being rotatable to move ice cream material from within the container through the hole;
   a blade in the container supported to rotate around the inner surface of the container and oriented for moving material down through the container;
   material moving means located toward the bottom of the container, supported to move around in the container while located toward the bottom and operable for moving material radially inwardly of the container and toward the hole through the bottom of the container while it also moves around in the container; and
   means for both moving the blade and the material moving means together the container around in.

2. The apparatus of claim 1, wherein the blade is oriented to incline downwardly and to extend along the inner surface of the container and being connected with the rotary member to be rotated with that member, and the blade is oriented to incline downwardly in the counter-rotation direction.

3. The ice cream preparation apparatus of claim 1, wherein the moving means comprises a second rotary, screw threaded member oriented to extend radially of the container and means for rotating the second rotary member in a rotary direction for moving material that is at the bottom of the container toward the hole through the bottom of the container for delivering that material to the first mentioned rotary member at the hole in the container.

4. The ice cream preparation apparatus of claim 1, further comprising a supporting member disposed in the hole in the container, the supporting member having an opening therethrough; the opening in the supporting member being sized for engaging the periphery of the screw part of the rotary member; the rotary member being received, supported and guided in the hole in the supporting member, so that material moved by the first rotary member is moved through the opening in the supporting member.

5. The ice cream preparation apparatus of claim 1, further comprising means for holding an agent for storing cold around the cold storage container.

6. The ice cream preparation apparatus of claim 3, further comprising a second blade extending up through the container rotatable with the rotary member and radially spaced inward from the inner wall of the container as the rotary member rotates.

7. Apparatus for preparing ice cream, and the like, comprising:

a cold storage container having a bottom; a hole through the bottom; means for selectively opening and closing the hole through the bottom of the cold storage container; a first rotary member including a screw which is in the hole through the bottom of the container and the screw being rotatable to move ice cream material from within the container through the hole;

a first blade in the container supported to rotate around the inner surface of the container and oriented for moving material down through the container; the first blade is oriented to incline downwardly and to extend along the inner surface of the container and being connected with the first rotary member to be rotated with that member.

material moving means comprising a second rotary, screw threaded member located toward the bottom of the container and oriented to extend radially of the container, and means for rotating the second rotary member in a rotary direction for moving material that is at the bottom of the container radially inwardly toward the hole through the bottom of the container for delivering that material to the first mentioned rotary member at the hole in the container;

a second blade disposed toward the bottom of the container and alongside the second rotary member for moving together with the second rotary member.

8. The ice cream preparation apparatus of claim 7, wherein the second blade is positioned to the rear of the second rotary member with respect to the direction of rotation of the element around the first rotary member.

9. The ice cream preparation apparatus of claim 8, wherein the second blade has alternate corrugations and ridges at the side thereof facing toward the bottom of the container, alternating in the radial direction of the container.

10. The ice cream preparation apparatus of claim 7 further comprising a third blade extending up through the container rotatable with the rotary member and radially spaced inward from the inner wall of the container as the rotary member rotates.

11. The ice cream preparation apparatus of claim 7, wherein the first blade is oriented to incline downwardly in the counter-rotation direction.

12. The ice cream preparation apparatus of claim 7, wherein the material moving means further comprises means for rotating the second rotary member to move around the container and through the material therein as the second rotary member also rotates.

13. The ice cream preparation apparatus of claim 12, wherein the first and second blades are connected together to rotate together around the container.

14. Apparatus for preparing ice cream, and the like, comprising:

a cold storage container having a bottom; a hole through the bottom; means for selectively opening and closing the hole through the bottom of the cold storage container; a first rotary member including a screw which is in the hole through the bottom of the container and the screw being rotatable to move ice cream material from within the container through the hole;

a blade in the container supported to rotate around the inner surface of the container and oriented for moving material down through the container; the blade is oriented to incline downwardly and to extend along the inner surface of the container and being connected with the rotary member to be rotated with that member;

material moving means comprising a second rotary, screw threaded member located toward the bottom of the container and oriented to extend radially of the container and means for rotating the second rotary member in a rotary direction for moving material that is at the bottom of the container radially inwardly toward the hole through the bottom of the container for delivering that material to the first mentioned rotary member at the hole in the container;

the means for rotating the second rotary member comprising first engaging means held stationary at the container and second engaging means on the second rotary member and in engagement with the first engagement means and means for rotating the second rotary member around the container and through the material therein such that as the second rotary member is swept around the container along with the first rotary member, the engagement between the first and second engaging means rotates the second rotary member around its own axis for moving material toward the first rotary member.

15. The ice cream preparation apparatus of claim 14, wherein the blade is oriented to inclined downwardly in the counter-rotation direction.

* * * * *